United States Patent
Eusebione et al.

(10) Patent No.: US 10,150,243 B2
(45) Date of Patent: Dec. 11, 2018

(54) GRIPPING DEVICE FOR ENGAGING PREFORMS

(71) Applicant: S.I.P.A. Societa' Industrializzazione Progettazione E Automazione S.p.A., Vittorio Veneto (IT)

(72) Inventors: Ernesto Eusebione, Mareno di Piave (IT); Damiano Vardiero, Noale (IT); Matteo Zoppas, Conegliano (IT); Enrico Zoppas, Conegliano (IT)

(73) Assignee: S.I.P.A. Societa' Industrializzazione Progettazione E Automazione S.p.A., Vittorio Veneto (IT)

( * ) Notice: Subject to any disclaimer, the term of this patent is extended or adjusted under 35 U.S.C. 154(b) by 0 days.

(21) Appl. No.: 15/126,529

(22) PCT Filed: Mar. 16, 2015

(86) PCT No.: PCT/IB2015/051902
§ 371 (c)(1),
(2) Date: Sep. 15, 2016

(87) PCT Pub. No.: WO2015/140689
PCT Pub. Date: Sep. 24, 2015

(65) Prior Publication Data
US 2017/0095961 A1 Apr. 6, 2017

(30) Foreign Application Priority Data
Mar. 17, 2014 (IT) .............................. RM2014A0136

(51) Int. Cl.
*B29C 49/42* (2006.01)
*B25J 15/00* (2006.01)
(Continued)

(52) U.S. Cl.
CPC ....... *B29C 49/4205* (2013.01); *B25J 15/0028* (2013.01); *B25J 15/0047* (2013.01);
(Continued)

(58) Field of Classification Search
CPC .......................... B25J 15/0028; B25J 15/0047
(Continued)

(56) References Cited

U.S. PATENT DOCUMENTS 2,596,388 A * 5/1952 Elvis .................... A21C 11/006
425/292
3,209,401 A * 10/1965 Mehnert ................. B29C 49/76
425/525

(Continued)

FOREIGN PATENT DOCUMENTS

CN 101970195 A 2/2011
DE 102007033621 1/2009
DE 202012004015 10/2012

*Primary Examiner* — Paul T Chin
(74) *Attorney, Agent, or Firm* — Stetina Brunda Garred & Brucker

(57) ABSTRACT

A gripping device for supporting preforms made of a thermoplastic material, having necks with a different length, such necks having, in turn, a step obtained therein which may abut against a step obtained on the outer surface of the gripping device, i.e., the chuck, such a step of the chuck being located, for each preform, always at the same distance from the neck ring base.

7 Claims, 3 Drawing Sheets

(51) Int. Cl.
 *B29C 49/06* (2006.01)
 *B29K 105/00* (2006.01)
 *B29L 31/00* (2006.01)

(52) U.S. Cl.
 CPC ....... *B29B 2911/1442* (2013.01); *B29C 49/06* (2013.01); *B29K 2105/258* (2013.01); *B29L 2031/7158* (2013.01)

(58) Field of Classification Search
 USPC ....... 294/93, 195; 198/803.12; 425/535, 525
 See application file for complete search history.

(56) References Cited

U.S. PATENT DOCUMENTS

| | | | | |
|---|---|---|---|---|
| 3,224,038 | A * | 12/1965 | Budescheim | B29C 49/76 264/533 |
| 3,782,877 | A * | 1/1974 | Mehnert | B29C 49/50 425/288 |
| 4,187,070 | A * | 2/1980 | Martin, Jr. | B29C 49/58 264/533 |
| 4,390,338 | A * | 6/1983 | Bowers | B29C 49/58 264/503 |
| 4,572,355 | A * | 2/1986 | Hunter | B29C 49/4205 198/803.12 |
| 4,890,726 | A * | 1/1990 | Wissmann | B29C 31/002 198/803.12 |
| 4,955,655 | A * | 9/1990 | Caracciolo, Jr. | B25J 15/00 294/86.4 |
| 5,324,049 | A * | 6/1994 | Mistrater | B23B 31/1175 198/803.7 |
| 5,769,476 | A * | 6/1998 | Lawn | B29C 49/4205 198/803.12 |
| 5,911,376 | A * | 6/1999 | Scaglia | B65H 54/54 242/118.32 |
| 6,273,705 | B1 * | 8/2001 | Schoch | B29C 49/4205 425/535 |
| 6,551,544 | B1 * | 4/2003 | Singleton | B29C 49/58 264/536 |
| 9,522,482 | B2 | 12/2016 | Milkowski et al. | |
| 2004/0047940 | A1 | 3/2004 | Zoppas | |
| 2005/0092892 | A1 | 5/2005 | Goss | |
| 2010/0314348 | A1 | 12/2010 | Zoppas et al. | |

* cited by examiner

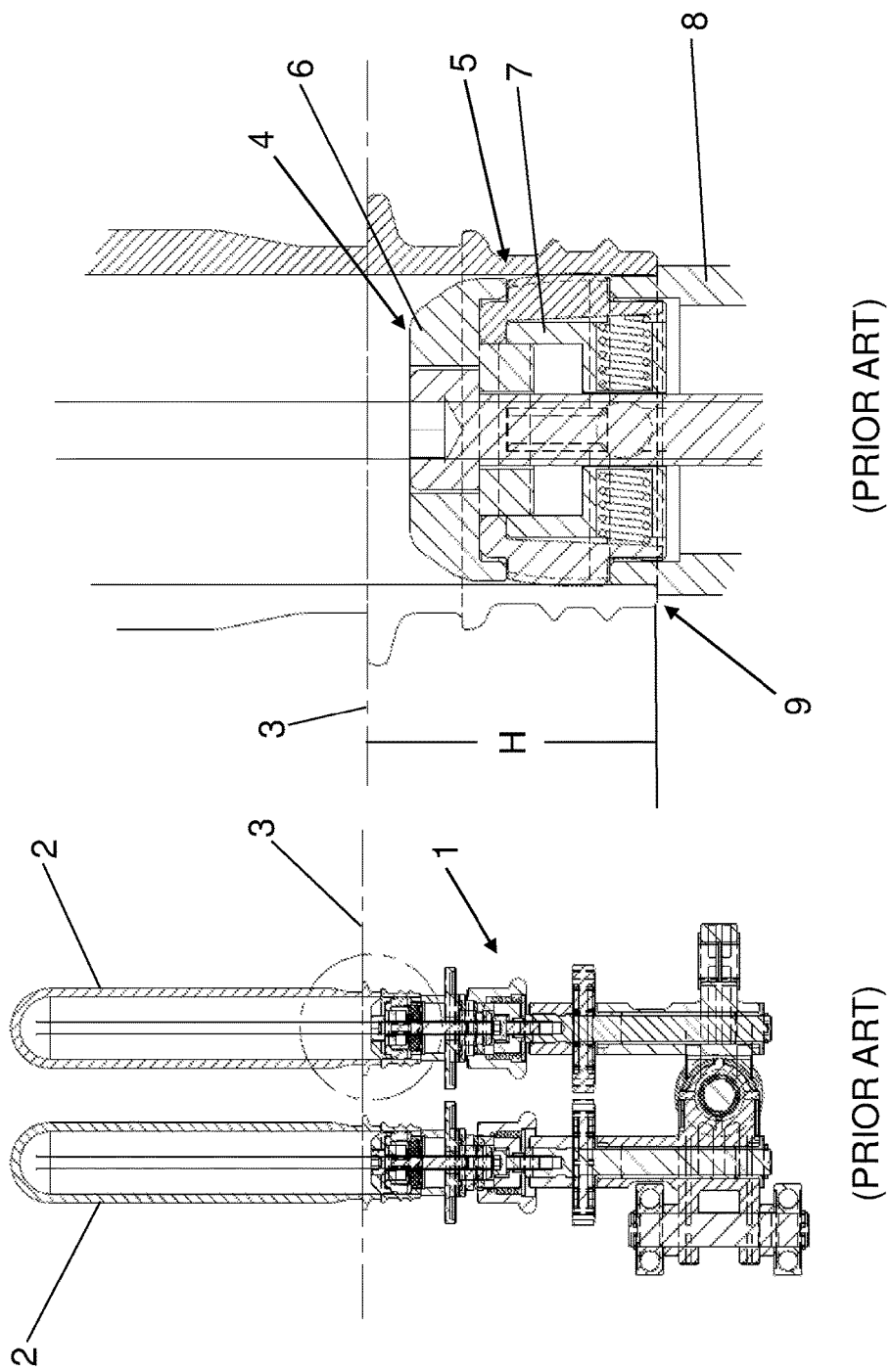

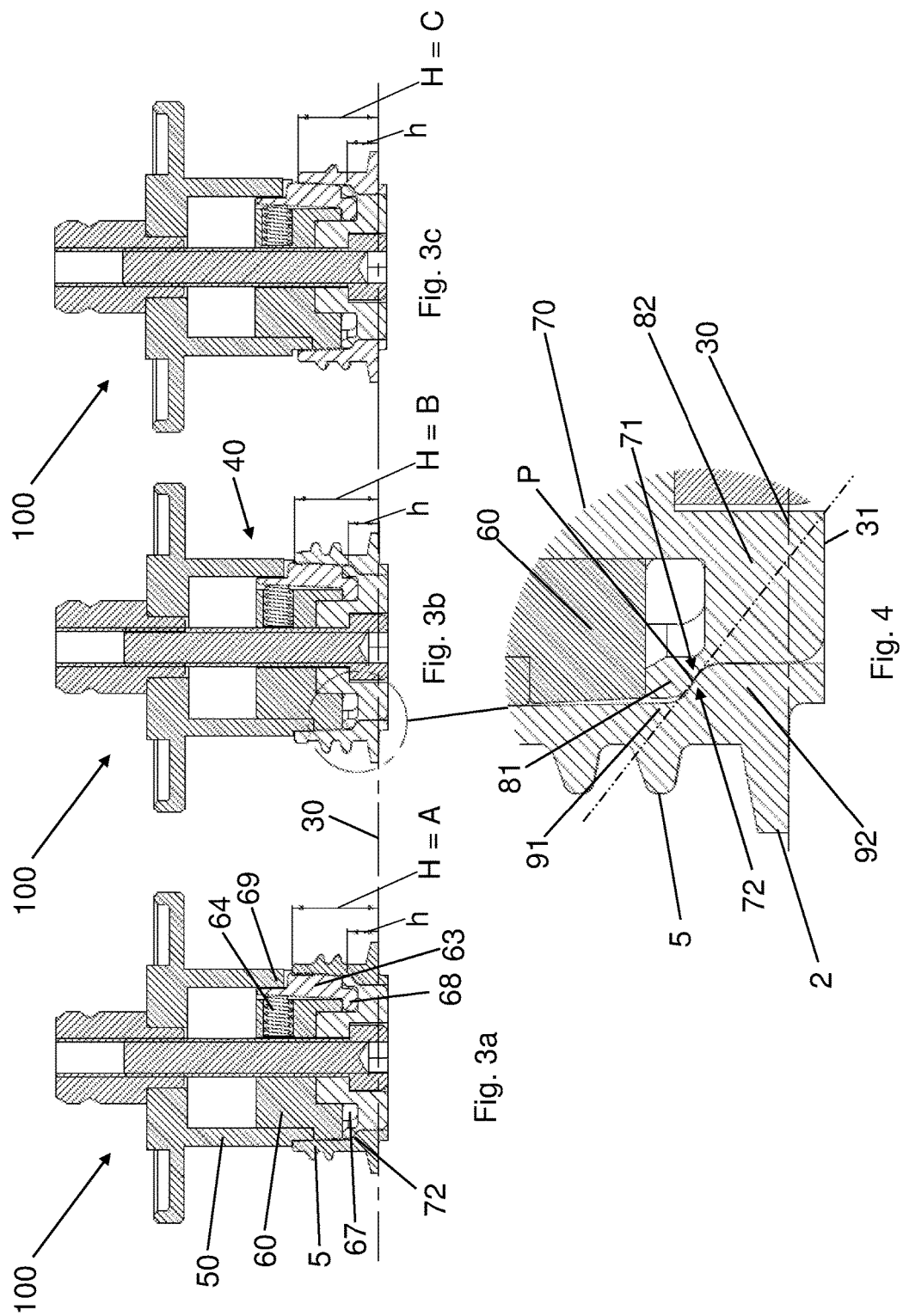

GRIPPING DEVICE FOR ENGAGING PREFORMS

CROSS REFERENCE TO RELATED APPLICATIONS

The present application claims priority to PCT International Application No. PCT/1132015/051902 filed on Mar. 16, 2015, which application claims priority to Italian Patent Application No. RM2014A000136 filed Mar. 17, 2014, the entirety of the disclosures of which are expressly incorporated herein by reference.

STATEMENT RE: FEDERALLY SPONSORED RESEARCH/DEVELOPMENT

Not Applicable.

FIELD OF THE INVENTION

The present invention relates to a chuck, i.e., a gripping device adapted to engage preforms made of a thermoplastic material so as to support, orient, and transport them during the several stages through which the preforms must pass for a further processing in order to obtain the end product, in particular during the thermal conditioning and blowing steps.

BACKGROUND ART

In a plant for manufacturing bottles made of a thermoplastic material, e.g., PET, the preforms are converted into the end product in suitable blowing machines by means of a blowing process. Before they can be processed in these blowing machines, which are well known from the prior art, the preforms are conveyed into the heating oven by means of so-called chucks secured along a transport chain. A chuck serves the function of engaging a respective preform by inserting it into the preform neck, so that it can be then supported when conveyed to the various processing stations; finally, it is released at the end of an operation cycle, being drawn therefrom. The chuck holds and supports the preform, in particular the neck thereof, this being the only portion which is kept cold inside the oven during the heating step. The grip must be sufficient to allow the preform to be spatially moved, without a release thereof due to the stresses to which the preform is typically subjected when moved. For the various units of a plant for manufacturing plastic bottles, the reference plane for the various operations is typically represented by the so-called "zero neck ring" plane, i.e., the plane corresponding to the base plane of an outer neck ring surrounding the preform. The preform loading star, the oven wheel, the chain with the chucks, the preform loading star inside the blowing wheel, the moulds, and the bottle discharging star are positioned with respect to this plane. FIG. 1 shows a pair of prior art chucks 1, each supporting a preform 2 respectively, where the chucks 1 are constrained to a conveyor device. The "zero neck ring" plane is here indicated by reference numeral 3. In FIG. 2, the head 4 of a prior art chuck inserted into the neck 5 of a preform 2 is shown in detail. Head 4 consists in turn of a first cap-shaped member 6, representing the end portion of the chuck, and of a second cylindrical member 7, which serves to block the preform in the support position. The part of the chuck 1 where head 4 is inserted consists of a tubular cylindrical part 8 having an outer diameter which is slightly larger than the inner diameter of the preform neck 5, and thus also of the blocking member 7, so as to define a step 9 at the height of the zone where head 4 is inserted. The so-formed step 9 is adapted to abut against the mouth of neck 5 defining the opening of preform 2. Thereby, for all the preforms which have a neck of the same predetermined length H, a constant distance H can be defined between the "zero neck ring" plane 3 and the neck/chuck abutment 9. When the format of the preform neck is changed, the chuck needs to be changed as well, due to two reasons: either because the neck diameter is changed, or because the neck height is changed; cases are frequent where the chuck needs to be replaced just because the height of the neck, but not its diameter, has changed. It is apparent that with the system described, whether the length of the preform neck should change, i.e., when bottles of a different format are to be produced, and if the same chuck were used, the reference "zero neck ring" plane 3 would also change, leading to adverse effects on the entire process chain. Therefore, replacing all the chucks of a production chain with other chucks suitable to the size of the new neck would be required. The number of chucks in a high-throughput bottle manufacturing plant may also exceed 500 units, whereby the replacement of the chucks, which is necessary due to the change of the preform neck, may require dead times of up to several hours. Therefore, based on the above considerations, the need is felt to manufacture chucks which are capable of minimizing or eliminating these drawbacks, providing chucks which are suitable to interact with preforms having necks with a different height.

SUMMARY OF THE INVENTION

It is the main object of the present invention to manufacture a chuck which can be used for different preform formats, in particular for preforms having a neck with a different length from format to format. This chuck does not need to be replaced whenever a change in the preform format occurs, i.e., whenever switching from manufacturing bottles having a neck with a determined length to manufacturing bottles having a neck with a different length is required.

Such an object is achieved by a gripping device, or chuck, of a preform or container provided with a neck which, according to claim 1, comprises:

a body adapted to be positioned coaxially inside the neck, having an end portion, means configured to frictionally engage the inner surface of said neck in order to block said preform or container integrally with the gripping device, characterized in that the end portion has a first zone with a first diameter and a second zone with a second diameter smaller than said first diameter and an interconnection zone forming a circumferential step, configured to abut against a step inside the preform neck and with a shape which is complementary to said step of the gripping device, so that the gripping device is adapted to be inserted into necks with a different length of preforms of different formats so that the plane under the neck ring of the preforms is always located at the same height, whichever the format is, The gripping device according to the invention may thus be used with preforms having necks with a different length when these necks have, in turn, a step obtained therein, which may abut against the step obtained on the outer surface of the body of the chuck, i.e., of the gripping device, such a step being located, for each preform, always at the same distance from the neck ring base. Thereby, the relative position between the "zero neck ring" plane and the chuck will be always the same for each preform, irrespective of the neck length. The end portion of the body of the chuck can be integral with the chuck itself, or it can be an end member, e.g. a cap, which is removable from the rest of the body of the chuck.

It is a further object of the present invention to provide a preform adapted to be gripped by a device according to the invention, said preform having a neck with a circumferential step therein, which acts as a reference position for the device in terms of gripping position, when said preform step abuts against the step of the device according to the invention.

Therefore, the present invention also provides a preform having a neck configured for the axial insertion of a gripping device, according to the present invention, wherein in an inner surface of the neck, a circumferential step is provided, which has a shape complementary to said step of the gripping device, adapted to form the only end abutment position against the gripping device during the insertion.

It is apparent that such a chuck can also be used for gripping blow-molded bottles or for other types of container, where necessary.

By virtue of the features of the invention, the continuity of the manufacture of bottles is ensured even in the case of a change of preforms having a different neck length, thus obtaining higher manufacturing yields.

BRIEF DESCRIPTION OF THE DRAWINGS

Further features and advantages of the invention will become more apparent in light of a detailed description of a preferred, but not exclusive, embodiment of a chuck according to the invention, shown by way of illustrative, non-limiting example, with the aid of the accompanying drawings, in which:

FIG. 1 shows the section of a pair of prior art chucks, each being in the gripping position of a preform.

FIG. 2 shows the section of an enlarged detail of a chuck in FIG. 1.

FIGS. 3a, 3b, 3c show sectional views of a chuck of the invention in a gripping position with preforms having different neck heights.

FIG. 4 shows a detail of the inner neck/chuck abutment in FIG. 3b.

DETAILED DESCRIPTION OF PREFERRED EMBODIMENTS OF THE INVENTION

Figure 5:
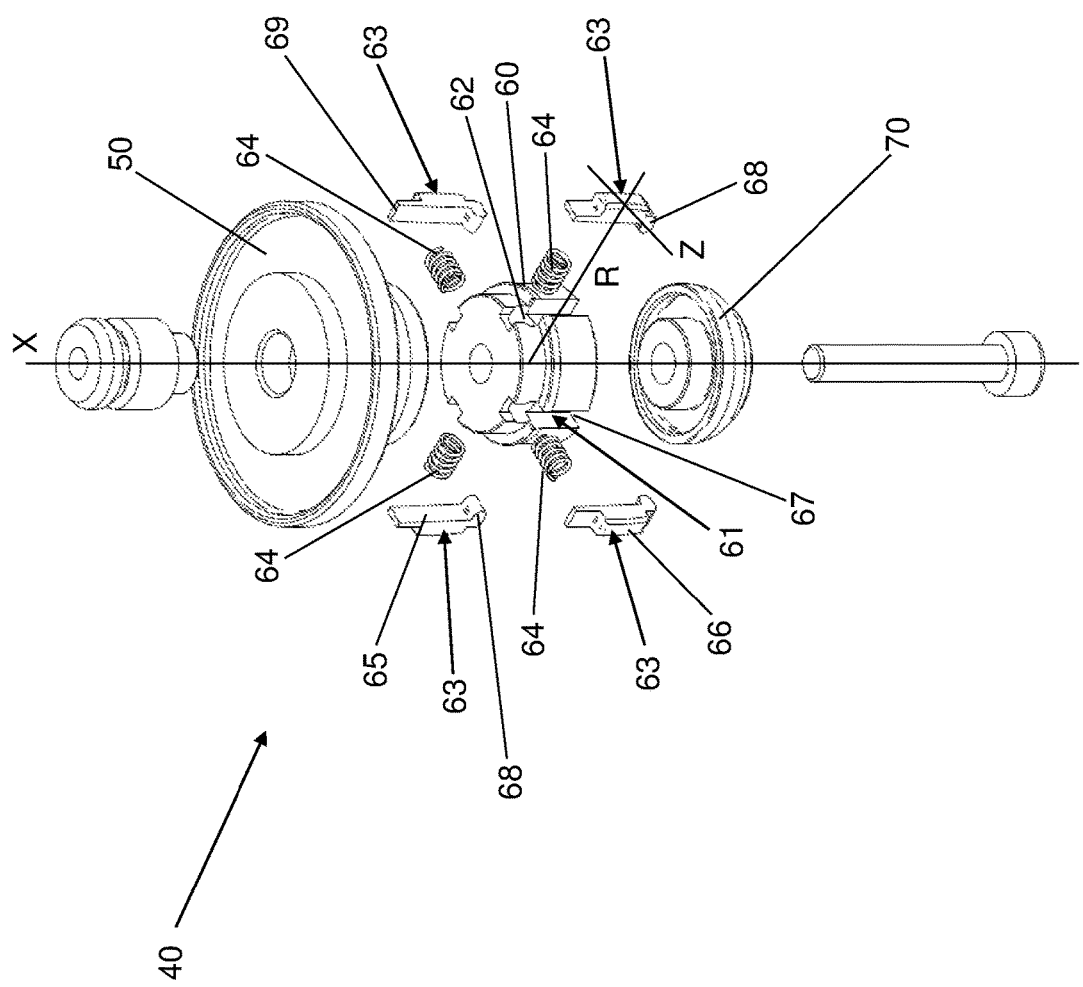
FIG. 5 shows an exploded perspective view of a preform blocking system.

FIGS. 3a, 3b, 3c and 4 show a solution provided by the present invention in order to obviate the drawback of having to change the chucks when preforms of different neck height are used while keeping the diameter constant. The idea underlying the present invention is to provide a chuck 100 having a shaped portion so that the neck/chuck abutment zone remains inside the preform neck, conveniently shaped in a complementary fashion with respect to the shaped portion of the chuck, thus keeping the distance between such an abutment and the "zero neck ring" 30 constant, even when the format of the preform neck is changed. Thereby, such a distance is made independent from the length of the preform neck. FIGS. 3a, 3b, 3c, and 4 show such a chuck 100. The chuck 100 described in these figures is a particular type of chuck according to the invention, but it is apparent that the arrangement in which the neck/chuck abutment is inside the preform neck and always at the same distance from the zero neck ring may be applied to any type of chuck, for example a chuck provided with blocking means other than those shown. In FIGS. 3a, 3b, 3c, a chuck 100 according to the present invention is shown while blocking preform necks with different heights. It is worth noting that, while the length H of the neck can vary according to the preforms, the distance h, i.e., the distance between the abutment and the zero neck ring, advantageously remains constant, even when using preforms with a different neck height H. As it can be seen from the figures, the chuck 100 ends, in its portion facing preform 2, with a body 40 adapted to be inserted into the neck of the preform and to block it. As it will be further described below, the end member 70 of body 40 has two zones 81, 82 with two different outer diameters, thus forming a peripheral, i.e., circumferential, step 71 in their interconnection zone, or transition zone. In particular, the first zone 81, which is outermost to the preform, i.e., proximal to the mouth when it is gripping the preform, has a diameter larger than that of the second zone 82, which is innermost to the preform, i.e., distal from the mouth, when it is in the gripping condition. The end member 70 also has a transition zone between the first zone 81 and the second zone 82, which comprises step 71. Preferably, but not exclusively, the first zone 81 and the second zone 82 have their respective axial length, substantially along axis X. Preferably, but not exclusively, the axial length of the second zone is larger than the axial length of the first zone. Preferably, but not exclusively, the first zone has a further interconnection zone with its end being distal to the second zone, such an end having a diameter smaller than the portion of the first zone which is proximal to the second zone. Preferably, but not exclusively, in said transition zone there is a change in concavity of the outer wall of the end member 70, hence an inflection point P, or flex, is present. Preferably, but not exclusively, the first zone 81 tapers towards the second zone 82, and/or the second zone 82 tapers in the same direction, i.e., towards the inside of the preform. It is worth noting that an inflection point refers to the figures showing sectional views. FIG. 5 shows an exploded perspective view of body 40 according to an embodiment, with the preform blocking system. Body 40, provided with a central axis X, consists of three members, an upper member 50, which can be tapered, a central member 60, and a cap-shaped end member 70; the cap 70 is the innermost portion with respect to the preform when the chuck is inserted therein. The central member 60, which can be tapered, is provided with a plurality of cavities 61 in the form of longitudinal grooves parallel to the central axis X. The cavities 61 have an inner wall 62 and an opening on the cylindrical surface. A gripping member 63 and an elastic means 64, interposed between the inner wall 62 and the gripping member 63, are included inside each cavity 61. The gripping members 63 have an inner side 65 facing the inner wall of cavity 61, and an opposite side 66 facing outwards; the outer side 66 projects beyond the cylindrical surface of the central member 60. According to the present embodiment, the elastic means 64 consist of springs, which act between the inner wall 62 of the respective cavity 61 and the corresponding inner side 65 of the respective gripping member 63. In each of the cavities 61, a niche 67 is also included, adapted to receive an end leg 68 of a respective gripping member 63. The gripping member 63 is held by the end leg 68 inside niche 67, but it freely swivels about an axis Z passing through such an end leg 68; axis Z is perpendicular to both the longitudinal axis X of the chuck 100, and to a radial axis R passing through the center of niche 67 and through the longitudinal axis X of the chuck. Thereby, the end leg 68 defines the fulcrum of the gripping member 63. Spring 64 acts on the inner side 65 of the gripping member 63, namely on the free end 69 located on the opposite side with respect to the end leg 68. The gripping member 63 can thus swivel about the axis Z passing through the end leg 68, and thereby, being pushed by spring 64, it is pressed with the outer side 66 against the inner surface of the neck 5 of preform 2, thus blocking it. The outer side 66 of the gripping member 63 is slightly curved to promote the insertion of the chuck into the neck 5 of preform 2. This arrangement promotes the insertion and release of the chuck from the preform neck 5, and also allows the same chuck to be used with preforms having necks with a slightly different diameter. With reference to FIGS. 3 and 4, as described above, it can be noted that the cap 70 of body 40 has a first zone 81 with a first diameter, and a second end zone with a second diameter smaller than the first diameter, so as to form the circumferential step 71. In particular, the step is comprised in a transition zone between the first zone 81 and the second zone 82. When inserting the chuck 100 into the neck 5 of preform 2, step 71 abuts against a corresponding step 72, shaped so as to be substantially complementary to step 71. Preferably, the abutment between step 71 and step 72 is the only abutment in the axial direction between the gripping device and the preform. Step 72 is formed on the cylindrical inner surface of the neck 5 of preform 2. Step 72 inside the bottle neck 5 is formed by the transition of the inner wall of neck 5 between a first part 91 having a first diameter and a second part 92 with a second diameter smaller than the first one; the first part 91 extends from the mouth of neck 5 up to step 72, and the second part extends from this step 72 up to the neck ring base, defining the "zero neck ring" plane 30 of the preform. The first diameter of the neck 5 of preform 2 is sufficient to allow the part of the body 40 of the chuck 100 having the largest diameter to be inserted into the bottle neck. Preferably, but not exclusively, step 72 is comprised in a transition zone between the first zone 91 and the second zone 92. Preferably, in said transition zone there is a change in concavity of the inner wall of the neck, therefore an inflection point, or flex, is present. The first zone 81, the second zone 82, and the transition zone of the gripping device are preferably all shaped so that their shape is complementary to the first zone 91, the second zone 92, and the transition zone of the preform, respectively. In FIG. 4, from the mouth to the neck ring, the transition zone of the inner wall of neck 5 has a concave curvature, followed by a convex curvature with equal curvature radiuses. The transition zone of the gripping device has a complementary shape. It is apparent that the zone of step 72 inside the neck 5 of preform 2 and the corresponding zone of the step 71 of body 40, i.e., the cap 70, can be obtained with profiles of a different type from that described, which is provided by way of example only. For any neck 5, irrespective of its length H, the zone of step 72 will always be located in the same position with respect to the zero neck ring, i.e., at the same distance h therefrom (FIG. 3). The position of the zone of step 72 in the preform neck is obviously determined by the position of step 71 on the outer surface of the cap 70 of the body 40 of the chuck 100. The distance of step 71 from surface 31 (FIG. 4), corresponding to the outer surface of cap 70 perpendicular to axis X and also defining the end of the chuck 100 on the side facing the inside of preform 2, is preferably dimensioned based on the position required for the gripping members 63 to grip the inner surface of the neck; furthermore, such a distance of step 71 from surface 31 is dimensioned by considering that the end portion of the chuck 100 should be prevented from penetrating the part of preform 2 which is subjected to heating inside the oven; in other words, step 71 is positioned by making sure that surface 31 not to exceed the part of the preform to be heated. Therefore, step 72 is preferably positioned around a position corresponding to the zone of the chuck 100 where the end leg 68 of the gripping member 63 i.e., of niche 67, is located. In the example shown in FIG. 3a, the zone of step 72 on the preform neck is at about 4 mm from the neck ring base defining the so-called "zero neck ring" plane 30, i.e., as described, in the zone defining the fulcrum of the gripping member 63. FIGS. 3a, 3b, 3c show the chuck 100 according to the invention under three different conditions, corresponding to three different lengths H of the neck. As it can be seen from these figures, even if the length H of the preform neck changes, in the example from a length of A, B, and C in FIGS. 3a, 3b, 3c, respectively, with A>B>C, the position of the chuck with respect to the "zero neck ring" plane, the height h, remains unchanged. In the embodiment described, step 71 was obtained by modifying the cap 70 of the chuck 100, with the advantage that the chucks having this end member can thus be adapted to the present invention by modifying only this part. This particular embodiment of the chuck in accordance with the invention has been described by way of example only, the chucks being also made with another shape encompassed in the scope of the invention, provided that they have an inner neck/chuck abutment the distance of which from the "zero neck ring" plane is constant, while varying the height of the preform neck. In particular, although the description of the invention has been given for a chuck using gripping members actuatable by spring means, it is apparent that it can also be applied to chucks using different gripping members, such as rubber rings or other elastic expanding means, for example. Solutions using rubber expanding rings inserted into a circumferential groove lead, for example, to the radial expansion of the ring due to an axial narrowing of the circumferential groove or to the inflation of the rubber ring, or to other means of a type known to those skilled in the art, thus producing a frictional contact against the inner wall of the neck of the preform or bottle.

The invention claimed is:

1. A gripping device of a preform or container provided with a neck, comprising:
    a body apt to be positioned coaxially inside the neck, having an end portion,
    members configured to frictionally engage the inner surface of said neck in order to block said preform or container integrally with the gripping device,
    characterized in that the end portion has a first zone with a first diameter and a second zone with a second diameter smaller than said first diameter, and an interconnection zone therebetween forming a circumferential step of the gripping device, configured to abut against a circumferential step inside the neck of the preform and with a shape complementary to said circumferential step of the gripping device,
    wherein when the gripping device is inserted in the preform, said circumferential step of the gripping device is the only portion of the gripping device axially abutting the preform,
    so that the gripping device is apt to be inserted into necks with a different length of different preform formats so that a plane under a neck ring of the preforms is always located at a same height, whichever the length of the neck of the preform is.

2. The gripping device according to claim 1, wherein in said interconnection zone there is a change in concavity of an outer wall of the end portion.

3. The gripping device according to claim 1, wherein said first zone and said second zone each have their respective axial length.

4. The gripping device according to claim 1, wherein said first zone tapers towards said second zone and said second zone tapers in a same direction towards which said first zone tapers.

5. The gripping device according to claim 1, wherein the end portion is a cap.

6. The gripping device according to claim 5, wherein said cap is reversibly constrained to the body.

7. A preform having a neck configured for an axial insertion of a gripping device according to claim 1, wherein there is provided a circumferential step in an inner surface of the neck, having a shape complementary to said circumferential step of the gripping device, apt to form the only end abutment position against the gripping device during the axial insertion.

* * * * *